J. H. TUTTLE.
SAW.
No. 9,807.  Patented June 21, 1853.
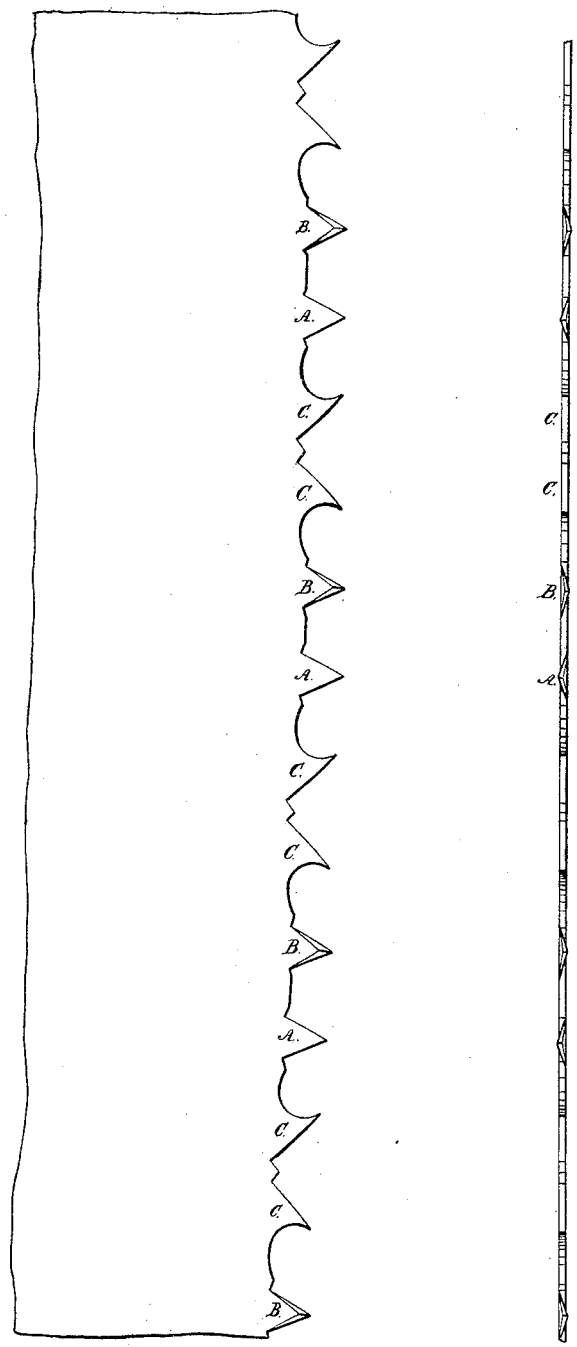

UNITED STATES PATENT OFFICE.

J. H. TUTTLE, OF SENECA, NEW YORK.

SAW.

Specification forming part of Letters Patent No. 9,807, dated June 21, 1853; Reissued August 9, 1870, No. 4,096.

*To all whom it may concern:*

Be it known that I, JOSEPH H. TUTTLE, of Seneca, in the county of Ontario and State of New York, have invented certain new and useful Improvements in Saws; and I do hereby declare the following to be a full, clear, and exact description of the same, reference being had to the accompanying drawings, making a part thereof.

Figure 1 represents a view on the edge of the saw, showing the "set" of the teeth, and Fig. 2 represents a side view of the same.

Similar letters in both the figures denote the same parts.

In the construction of saws heretofore no precise form or arrangement of teeth has been discovered by which the advantages gained in slitting or cutting with the grain of the wood can be with any economy applied to cross cutting or sawing across the grain. It is also well known that the very best slitting saw now in use will not cut across the grain at all, as the teeth formed to cut with the grain will not take hold of the wood, or if so, will choke and break the teeth when worked across the grain. The same difficulties exist with saws arranged for cross cutting. They cannot, without entire change, be applied to slitting.

The nature of my invention therefore consists in the so forming and arranging of the teeth on a saw blade as that the set of teeth which scores the sides of the kerf shall project slightly beyond the other set of teeth which planes out the wood between said scores, and so also that a portion of the planing teeth shall by their form and location act as a gage both to the fleam cutters or scorers and to themselves to prevent the teeth from taking too rank a hold on the wood, by which means the depth of the cut of both the sets of teeth are regulated, and makes the saw equally applicable to slitting or cross cutting.

To enable others skilled in the art to make and use my invention, I will proceed to describe the same in connection with the drawings in which—

A, A and B B represent the fleam or knife edged teeth, and C C, the curved planing teeth. The points of the fleam teeth are set in opposite directions—those A A, being set to the left hand and those B B, to the right hand, and their edges beveled off in the direction of the "set" of the teeth or from the center toward the outside of the saw. The planing teeth C, are cut out under their front or cutting edges in the form of an irregular curve, so as to give them a slightly hooked shape, making as it were a planing or cutting instead of a rasping edge. The backs of the teeth C, are slightly curved, so as to stand at about an angle of 45 degrees, more or less, to the front of the saw, and are placed contiguous to each other back to back and curve in opposite directions to a suitable distance from each other, and only one of the set is in actual cutting operation at a time, viz: those which curve in the direction of the motion of the saw for the time being—while the other set, or those curved in the opposite direction, serve as guides to the cutting teeth to prevent them from taking too rank a hold on the wood. The fleam cutters, of which there are two, placed between every two sets of the planing cutters or teeth, have their points projecting beyond those of the planing teeth and cut two straight scores—one on each side of the kerf—the intermediate wood being planed out by the curved teeth C. The curved teeth C are at such distances apart as to allow each alternately to cut to a proper depth, and become alternately guides to each other and permanently guides to the scoring of fleam cutters to prevent them from cutting deeper than a given distance into the wood, thus in a word making the teeth which are not cutting serve as guides to those that are cutting, by which means the saw will cut from end to end in both directions and be equally applicable to slitting or cross cutting, for the rankness of the cut being limited prevents the teeth in either case from being drawn into the wood or from choking and gives great ease and efficiency to the operation of the saw.

Various attempts have been made to combine and arrange cutting and cleaning teeth upon saws, but in the most of these they either cut in only one direction or else one half of the saw cuts in one direction and the other half in the opposite direction only, thus losing at each stroke of the saw one half of its effect, while by my method of arranging the teeth in pairs or sets upon the blade and their peculiar shape I produce a saw which cuts through its entire length in both directions, and at the same time the planing teeth serve alternately as gages for each other, while allowing each to cut to a proper depth, and permanently as gages to the fleam cutters, which produces a uniform continuous planing operation, as it were, instead of an irregular rasping one, as has been the case heretofore.

Having thus fully described my invention, what I claim therein as new and desire to secure by Letters Patent, is—

The combination, arrangement and location upon the same blade, of the sets of fleam teeth for scoring the sides of the kerf, and the sets of planing teeth for removing the wood between the scores, when said planing teeth are placed back to back, curve in opposite directions, and are between the sets of fleam cutters, and at sufficient distances apart so that each planing tooth shall serve alternately as a gage to its fellow, while allowing it to cut to a proper depth, and be a permanent guide to the fleam cutters, to prevent any of the teeth from taking too rank a hold upon the wood, which makes it run with great ease and efficiency, and is applicable to slitting or cross cutting substantially as described.

JOSEPH H. TUTTLE.

Witnesses:
 CHAS. J. FOLGER,
 GEO. ECKLEE.

[FIRST PRINTED 1913.]